US006719456B2

(12) United States Patent
Mundt et al.

(10) Patent No.: US 6,719,456 B2
(45) Date of Patent: Apr. 13, 2004

(54) METHODS AND APPARATUS FOR FIREFIGHTING

(76) Inventors: Randall S. Mundt, 4820 Wingate Dr., Pleasanton, CA (US) 94566; James C. Mundt, 917 Jefferson St., Sauk City, WI (US) 53583

( * ) Notice: Subject to any disclaimer, the term of this patent is extended or adjusted under 35 U.S.C. 154(b) by 0 days.

(21) Appl. No.: 10/045,676

(22) Filed: Oct. 23, 2001

(65) Prior Publication Data

US 2003/0076867 A1 Apr. 24, 2003

(51) Int. Cl.[7] .......................... G01N 25/00; G01K 1/14; G08B 17/00

(52) U.S. Cl. .......................... 374/45; 374/141; 340/577; 340/628

(58) Field of Search .......................... 374/45, 208, 155, 374/141, 107, 110; 116/5, 101; 340/577, 584; 337/298

(56) References Cited

U.S. PATENT DOCUMENTS

| | | | | | |
|---|---|---|---|---|---|
| 3,017,513 | A | | 1/1962 | Messelt | 250/83.3 |
| 3,761,713 | A | | 9/1973 | Merrill | 250/341 |
| 4,324,138 | A | * | 4/1982 | Davis et al. | 73/341 |
| 4,505,600 | A | * | 3/1985 | Suzuki et al. | 374/170 |
| 4,506,549 | A | * | 3/1985 | Thome | 73/582 |
| 4,550,313 | A | * | 10/1985 | Kimura | 340/584 |
| 4,630,036 | A | * | 12/1986 | Ford | 340/622 |
| 4,744,038 | A | * | 5/1988 | Okayama | 364/557 |
| 4,884,222 | A | * | 11/1989 | Nagashima et al. | 364/550 |
| 5,005,003 | A | * | 4/1991 | Ryser et al. | 340/587 |
| 5,022,014 | A | * | 6/1991 | Kulczyk et al. | 367/87 |
| 5,105,493 | A | | 4/1992 | Lugtenaar | 7/116 |
| 5,345,830 | A | * | 9/1994 | Rogers et al. | 73/866 |
| 5,352,039 | A | | 10/1994 | Barral et al. | 374/121 |
| 5,425,582 | A | | 6/1995 | Asano et al. | 374/208 |
| 5,436,614 | A | | 7/1995 | Torikoshi et al. | 340/584 |
| 5,461,367 | A | * | 10/1995 | Altavela et al. | 340/584 |
| 5,584,579 | A | | 12/1996 | Asano et al. | 374/208 |
| 5,751,215 | A | * | 5/1998 | Hall, Jr. | 340/584 |
| 5,883,568 | A | * | 3/1999 | Boyden | 340/287 |
| 5,961,314 | A | * | 10/1999 | Myhre et al. | 431/79 |
| 6,000,845 | A | * | 12/1999 | Tymkewicz et al. | 374/155 |
| 6,161,958 | A | * | 12/2000 | Rattman et al. | 374/1 |
| 6,195,011 | B1 | * | 2/2001 | Winterble et al. | 340/589 |
| 6,198,399 | B1 | * | 3/2001 | Mattis | 340/628 |
| 6,215,405 | B1 | * | 4/2001 | Handley et al. | 340/584 |
| 6,384,731 | B1 | * | 5/2002 | Sutherland | 340/577 |
| 2001/0038334 | A1 | * | 11/2001 | Magerle et al. | 340/584 |

FOREIGN PATENT DOCUMENTS

| | | | | |
|---|---|---|---|---|
| JP | 200263666 | * | 8/2000 | G01J/1/42 |

* cited by examiner

*Primary Examiner*—Gail Verbitsky
(74) *Attorney, Agent, or Firm*—Larry Williams

(57) ABSTRACT

A method of detecting fire ignition sources includes using an electronic temperature sensor to probe potential ignition sites. The fire hazards for the sites are determined based on at least one of measurements of temperatures at or near the site, measurements of rate of temperature rise at or near the site, and measurements of temperature gradients at or near the site. Apparatus for performing the method is also described.

15 Claims, 3 Drawing Sheets

METHODS AND APPARATUS FOR FIREFIGHTING

This invention was made with government support under Cooperative State Research, Education, and Extension contract 2001-33610-10398 awarded by the United States Department of Agriculture. The government has certain rights in the invention.

TECHNICAL FIELD

The present invention relates to methods and apparatus for detecting heat sources; more particularly, methods and apparatus for detecting forest fire ignition sources.

BACKGROUND

There are several stages in wild fire (forest fire) suppression and control activities. These stages include but are not limited to preparation, detection, suppression, and mop-up. The preparation stage might involve the strategic stockpiling of appropriate materials, the construction of fire roads, and controlled burns. Prompt and accurate detection of wild fires via human spotters, remote instrumentation and space-based sensors allows efficient suppression activity to be taken while the fire is still tractable. The suppression phase utilizes a coordinated mix of activities and technologies ranging from direct human efforts (Smokejumpers, etc.) to aerial water and/or fire retardant applications. The final mop-up phase insures that the contained and controlled fire is rendered harmless and does not re-ignite.

The last phase of the firefighting activity, mop-up, is critical. There are numerous cases where wild fires that were apparently contained and effectively suppressed have re-ignited and grown to be a much larger problem than the original. Mop-up activities often must be undertaken when firefighting personnel and systems are highly stressed and exhausted by the suppression phase. One of the most immediate and important activities in the mop-up phase is "cold-trailing". Cold-trailing is the careful inspection of the wild fire perimeter for potential re-ignition sources and the elimination of these sources. A single smoldering root concealed by a cover such as an ash layer or other debris has the potential to re-ignite the fire days or even weeks later.

The current practice of cold trailing requires, for example, that firefighting personnel carefully inspect a fifty foot band at the perimeter of a fire area or area of a recent fire. In some situations, the entire fire area may be inspected. The firefighter must carefully inspect those locations most likely to harbor hidden and sheltered ignition sources—e.g. under charred stumps or fallen logs. These potential ignition sources often have a cover such as a thick layer of ash and/or are not otherwise directly observable. Current cold-trailing practice requires that the firefighters manually reach into these possible ignition sources and feel for heat with his or her bare hand. It is fairly obvious that this activity exposes the firefighter to the very real probability of burnt fingers or hands. In addition, adequate inspection of likely ignition locations can require significant physical activity such as stooping, bending, and stretching. The quality and effectiveness of the cold-trailing effort is directly impacted by the discomfort and effort a firefighter must expend to perform this activity.

Clearly, there is a need for a tool that allows the cold-trailing activity to be performed both more effectively and with less risk or discomfort for the firefighter. In addition, there is a need for methods and apparatus that can significantly accelerate the cold-trailing activity while increasing the likelihood that covered or otherwise concealed ignition sources will be located and eliminated.

SUMMARY

This invention seeks to provide methods and apparatus that can overcome deficiencies of known fire fighting procedures. Practicing this invention makes it possible to perform fire fighting activities such as detecting fire ignition sources and assessing fire hazard more rapidly, more accurately, and more safely than is usually possible with the standard fighting procedures.

One aspect of the present invention is a method of looking for potential forest fire ignition sites. In one embodiment, the method includes the step of probing potential sites with an electronic temperature sensor. The method further includes measuring at least one of temperature and rate of rise of temperature so as to determine the potential fire hazard and providing a signal of the fire hazard based on the measurements. Next, the method includes repeating the previous steps at each new potential site.

Another aspect of the present invention is an apparatus for probing concealed potential fire ignition sites and detecting a fire hazard. In one embodiment, the apparatus includes a temperature sensor comprising a temperature sensitive element for providing an electrical signal proportional to temperature or an electrical signal proportional to a change in temperature. The apparatus also includes an electronic circuit electrically connected with the sensor so as to receive the electrical signal from the sensor. The circuit is capable of deriving at least one of a temperature and a rate of temperature rise using the signal from the sensor, and the circuit is capable of converting the signal from the temperature sensor into a second signal for at least one of an audible indication and a visual indication. Also included in the apparatus is an elongated member having a first end and a second end. The temperature sensitive element is attached to the member and positioned near the second end of the member.

When using the apparatus, a fireman or other person can hold the member near the first end and position the sensor in or near the potential fire ignition sites so that the sensor and the circuit can determine the fire hazard.

Another aspect of the present invention is a method performed in an electronic device such as a microprocessor for electronically identifying fire hazards at potential fire ignition sites. The electronic device is used in combination with a temperature sensor. The method includes the steps of: a) acquiring signals from the temperature sensor; b) converting the signals into digital information representing at least one of a temperature, a rate of rise of temperature, and a temperature gradient; c) comparing the signals to at least one reference parameter to identify a fire hazard; d) providing a command to indicate a fire hazard when a fire hazard is identified in step c; and e) reducing power consumption of the microprocessor after a predetermined period of time.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out aspects of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above and still further features and advantages of the present invention will become apparent upon consideration of the following detailed descriptions of specific embodiments thereof, especially when taken in conjunction with the accompanying drawings.

DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For illustrative purposes, the various apparatus and methods of the present invention are illustrated and described below in conjunction with applications for fighting and controlling forest fires, particularly for fire fighters involved in locating possible ignition sources. It should be apparent, however, that the apparatus and methods of the present invention can be used with many different types of fire fighting situations.

Generally, the present invention pertains to methods and apparatus for detecting fire ignition sources. More specifically, embodiments of the present invention involve inserting a temperature sensing apparatus into or near a potential fire ignition source and measuring at least one of the absolute temperature and the rate of temperature rise so as to determine the potential fire hazard.

Figure 1:
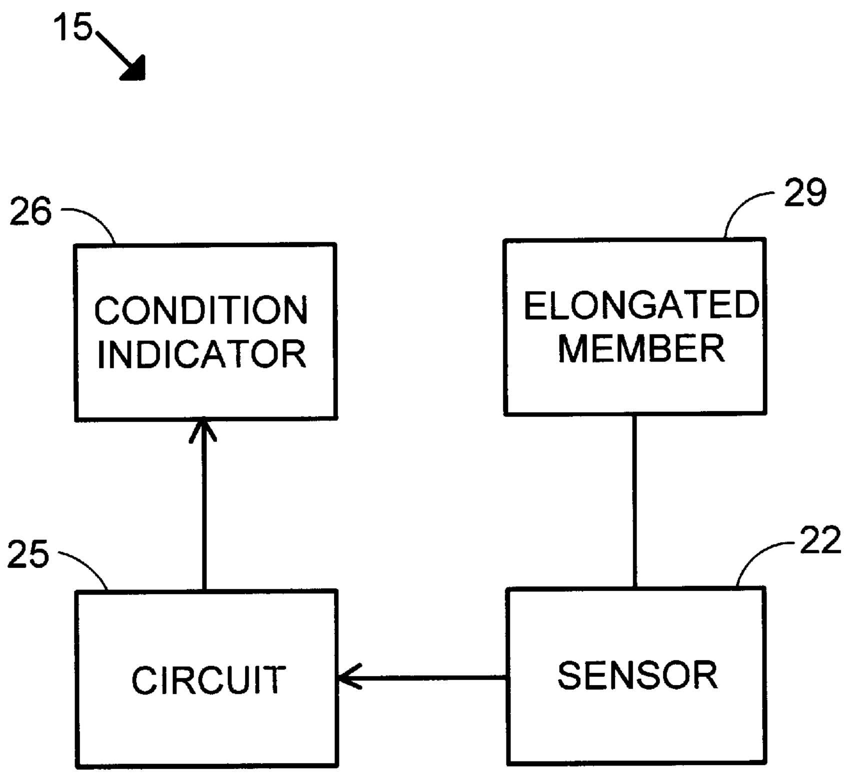
FIG. 1 is a block diagram of an embodiment of the present invention.

Reference is now made to FIG. 1 wherein there is shown a block diagram of a fire hazard detector 15 according to an embodiment of the present invention. Fire hazard detector 15 includes a thermal sensor 22 for measuring temperature, an electronic circuit 25, a condition indicator 26, and an elongated member 29.

Thermal sensor 22 includes a temperature sensitive element for generating an electrical signal proportional to temperature or an electrical signal proportional to a change in temperature. Thermal sensor 22 is electrically connected with electronic circuit 25 so that the electrical signal from sensor 22 can be received by electronic circuit 25. In one embodiment sensor 22 is electrically connected with electronic circuit 25 via one or more electrically conductive wires.

Electronic circuit 25 is capable of deriving a measure of temperature or a rate of temperature rise using the signal from sensor 22. Electronic circuit 25 is connected with condition indicator 26 so that information generated by circuit 25 can be provided to indicator 26 to communicate to a user of detector 15 whether a fire hazard has been detected. In one embodiment, electronic circuit 25 is connected with indicator 26 using standard wiring interconnection methods for electronic devices. In other embodiments, a wireless communication system can be used to transfer information between the temperature sensing components and indicator 26.

In preferred embodiments, electronic circuit 25 is designed for rapid response to the characteristic properties of a concealed ignition source. In one way, this is accomplished by monitoring the time differential (in other words, the rate of rise) of the temperature rather than the absolute value of the temperature. The time differential measurement allows for a more sensitive and rapid response while minimizing the effects of the ambient temperature. In preferred embodiments, circuit 25 incorporates a predetermined rate of rise that serves as a reference value for comparing the measured rate of rise so that a fire hazard is identified when the measured rate of rise exceeds the reference rate of rise. An example of a suitable reference rate of rise for embodiments the present invention is about 0.1 degrees C. per second.

Embodiments of the present invention that rely on temperature measurements rather than rate of temperature rise may also have a predetermined reference temperature for use in comparing the measured temperature. An example of a suitable reference temperature for embodiments of the present invention is a temperature of about 100 degrees C.

In one embodiment, electronic circuit 25 includes an amplifier section capable of converting the signal and increasing the strength of the signal from sensor 22 to a level more suitable for further processing of the information. Optionally, electronic circuit 25 includes a differentiating section capable of providing an output signal proportional to the rate of change of the input signal, a comparator section capable of comparing an input signal to a preset threshold level and provide an output based on that comparison, and an indicator drive section capable of activating appropriate audible indicators and visual indicators included in condition indicator 26. These functions can be implemented using well-known readily available electronic devices such as electronic devices that include at least one of (a) solid-state operational amplifiers (op amps), (b) a microprocessor, and (c) a central processing unit. A preferred embodiment of the present invention includes a microprocessor.

In the more preferred embodiments, the components of electronic circuit 25 are selected for low current and low voltage operation, whenever possible, so as to allow extended operation from a limited power source such as battery of modest capacity and size. In one embodiment of the present invention, the power supply comprises four 1.5 v AA batteries. These batteries can power the electronic circuit for more than 1000 hours.

Condition indicator 26 may include an instrument for providing at least one of an audible indication, a visual indication, and a tactile indication. Examples of suitable instruments that can be used for providing an audible indication are speakers, buzzers, bells, piezoelectric sound-producing elements, and other sound producing instruments. Examples of suitable instruments that can be used for providing visual indication are lights, light emitting diodes, meters, and display screens. Examples of suitable instruments that can be used for providing a tactile indication are mechanical vibrators, piezoelectric vibration-producing elements, and instruments capable of producing tactile responses.

Elongated member 29 is connected with temperature sensor 22. Preferably, sensor 22 is connected with member 29 at a position near one end of member 29 so that member 29 provides a support for sensor 22. Preferably, member 29 is substantially rigid and is thermally stable under the temperature conditions for which it will be used.

Member 29 may comprise a variety of materials. Some example materials suitable for member 29 are aluminum, aluminum alloys, other types of metals and metal alloys, and composite materials such as fiberglass. In preferred embodiments member 29 has a bore or channel through its interior. In other words, it is preferable for member 29 to have a bore, like that for a hollow tube, so that wires can be run through the bore from sensor 22 to a position suitable for connection with circuit 25.

In one embodiment of the invention, thermal sensor 22 includes a temperature sensitive resistive element, such as a thermistor, encased within a thermally conductive sheath and attached to one end of member 29. It is to be understood that thermal sensors other than thermistors are suitable for embodiments of the present invention. As an example, another suitable thermal sensor for embodiments of the present invention is a thermocouple.

Clearly, the use of an electronic temperature sensor rather than a firefighter's hand to detect hot spots has obvious advantages for the firefighter and also has obvious advantages for the effectiveness of the cold trailing activity. The elimination of potential pain and injury for the firefighter promotes more through and more rapid cold-trailing activities than is practiced using the standard technology and methods. The thermal sensor is designed to be more sensitive than the human hand, thus providing an indication of a hot spot if the sensor is inserted into or near an ignition source.

Figure 2:
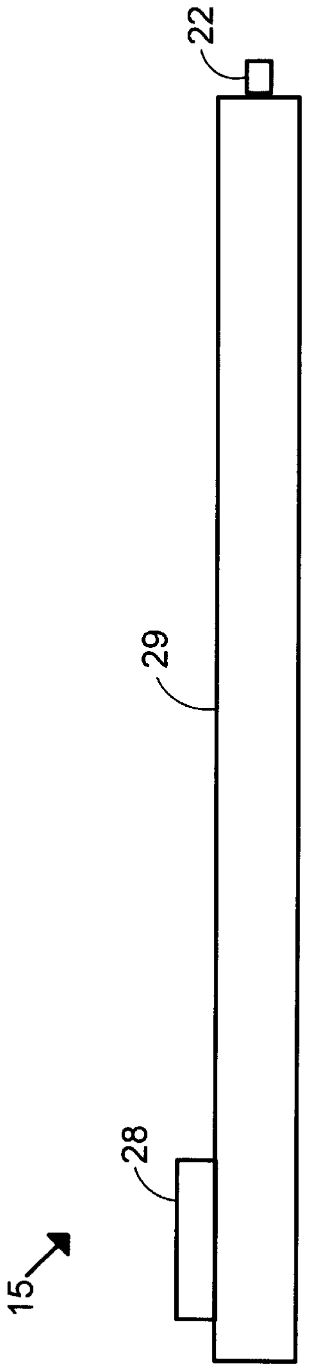
FIG. 2 is a side view of an embodiment of the present invention.

Reference is now made to FIG. 2 wherein there is shown a side view diagram of a fire hazard detector 15 according to an embodiment of the present invention. Fire hazard detector 15 has essentially the same features described for the block diagram presented in FIG. 1. Detector 15 includes a thermal sensor 22 for measuring temperature, a housing 28, and an elongated member 29. Preferably, housing 28 is a substantially rigid structure. Detector 15 further comprises an electronic circuit (not shown in FIG. 2) and a condition indicator (not shown in FIG. 2). For the embodiment shown in FIG. 2, housing 28 substantially contains the electronic circuit. Furthermore, the condition indicator is connected with housing 28 so that the condition indicator is an integral part of housing 28. In a preferred embodiment, housing 28 comprises a molded plastic enclosure. This enclosure provides a lightweight, substantially hermetically sealed environment for the electronic circuitry. As an option, housing 28 may be configured so that it is capable of holding a power source such as batteries for powering the electronic circuit or other electrical components. In preferred embodiments, housing 28 provides a substantially hermetically sealed environment for isolating and protecting the electronic circuit from damage.

Elongated member 29 is connected with temperature sensor 22. Preferably, sensor 22 is connected with member 29 at a position near one end of member 29 so that member 29 provides a support for sensor 22. The housing 28 is connected with member 29 so that member 29 supports housing 28. Preferably, housing 28 is connected with member 29 at a position toward the end opposite the position of sensor 22 on member 29. Optionally, member 29 may have a bore (not shown in FIG. 2) to allow a wire (not shown in FIG. 2) to connect the electronic circuit in housing 28 with sensor 22. In preferred embodiments, member 29 comprises a hollow tube.

Figure 3:
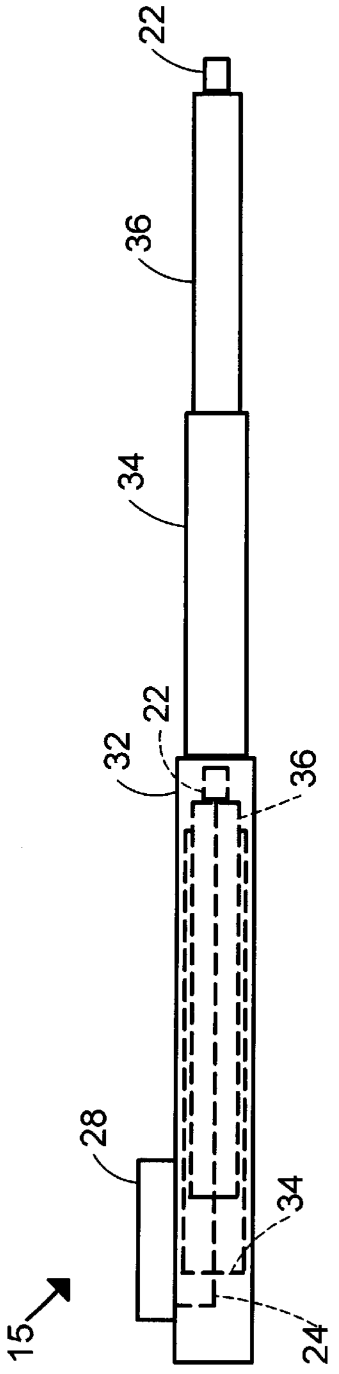
FIG. 3 is a side view of an embodiment of the present invention when extended and when retracted, where the dashed lines are movable components.

Reference is now made to FIG. 3 wherein there is shown a side view of a fire hazard detector 15 according to a preferred embodiment of the present invention. Detector 15 shown in FIG. 3 is substantially the same as the detector shown in FIG. 2 with the exception that the embodiment presented in FIG. 3 includes an elongated member comprised of three sections of tubing: a large diameter section 32, a medium diameter section 34, and a small diameter section 36. Section 36 is arranged so that it slidably fits into the interior of section 34. Section 34 is arranged so that it slidably fits into the interior of section 32. Section 32, section 34, and section 36 are connected so that they form a substantially single unit that can be extended for a longer length or retracted to have a shorter length. In other words, the elongated member has section 32, section 34, and section 36 configured to form telescoping sections. FIG. 3 uses solid lines to show the elongated member when extended. In addition, FIG. 3 uses dashed lines to show the elongated member when retracted.

As described earlier for FIG. 2, detector 15 shown in FIG. 3 also includes a thermal sensor 22 for measuring temperature, and a housing 28. Preferably, housing 28 is a substantially rigid structure. Detector 15 further comprises an electronic circuit (not shown in FIG. 3) and a condition indicator (not shown in FIG. 3). For the embodiment shown in FIG. 3, housing 28 substantially contains the electronic circuit. Furthermore, the condition indicator is connected with housing 28 so that the condition indicator is an integral part of housing 28.

The elongated member comprised of section 32, section 34, and section 36 is connected with temperature sensor 22. Preferably, sensor 22 is connected with the elongated member near the end of section 36 that is furthest away from the opposite end of the elongated member. As described before, the elongated member provides a support for sensor 22. Housing 28 is connected with section 32 of the elongated member so that section 32 supports housing 28. Preferably, housing 28 is connected with the elongated member at a position toward the end opposite the position of sensor 22. Member 29 has a bore (not shown in FIG. 3). Detector 15 also includes one or more extendable wires 24 that run within the interior bore of the elongated member from the thermal sensor to the electronic circuit. Wires 24 connect the electronic circuit in housing 28 with sensor 22. FIG. 3 shows wires 24 as a dashed line for the retracted elongated member.

Ideally, the elongated member is designed to be light in weight and retractable (i.e. collapsible) so as to allow easy transportation by the firefighter or other users. In a preferred embodiment of the present invention, elongated member sections 32, 34, and 36 comprise a set of three telescoping aluminum tubes. Section 32 has a diameter of about 1 inch, section 34 has a diameter of about ⅞ inch, and section 36 has a diameter of about 0.75 inch. This set of telescoping tubes can extend from a closed length of about 15 inches to a fully extended length of about 40 inches. When extended the tube sections are maintained in rotational alignment and nested length using well-known anti-rotation and locking mechanisms. Intermediate lengths between the fully retracted 15 inches and the fully extended 40 inches can be provided by appropriate design of the locking mechanisms.

As an option, some embodiments of the present invention may be arranged so that the thermal sensor is positioned substantially within the telescoping tube when fully retracted.

In another embodiment of the present invention, the electrical components are connected so that the electrical and electronic functions are turned off when the elongated member is fully retracted. For instance, an embodiment of the present invention may include an on/off switch arranged so that the switch is engaged when the member is extended and disengaged when the member is retracted.

A preferred embodiment of the present invention includes an electronic circuit that includes a microprocessor capable of providing an "automatic" shutoff capability to insure longer battery life. For instance, after a predefined period of inactivity, the microprocessor may issue instructions to signal the user that the electronic and electrical functions are about to be shutoff. In one embodiment, the signal to the user may include multiple beeps. After the signal is sent, the microprocessor then issues an instruction that shuts off the electrical and electronic functions so as to conserve power. This means that if the power source for the embodiment includes a battery, then the battery drain will be reduced. This also allows embodiments that include a collapsible elongated member to have power conservation capabilities that are independent of whether the elongated member is retracted or extended.

Figure 4:
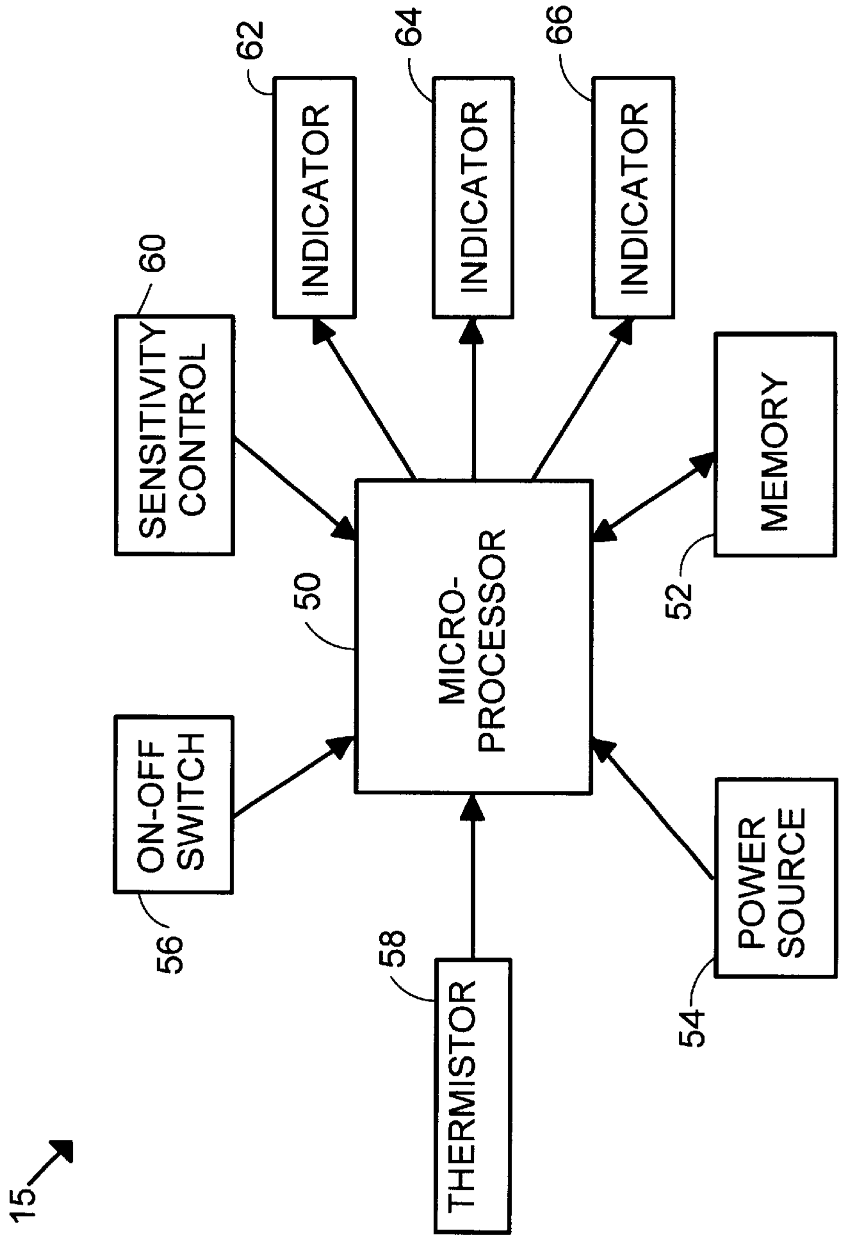
FIG. 4 is a block diagram of a preferred embodiment of the present invention.

A variety of components and configurations can be used in different embodiments of the present invention. An example set of components and a configuration for an embodiment of the present invention are shown in FIG. 4. Detector 15 shown in FIG. 4 includes a microprocessor 50 and a memory 52 connected to allow information and data exchange. An example of a suitable microprocessor is an eight-bit microprocessor with an eight-bit A/D converter. Of course, a variety of commercially available microprocessors can be used embodiments of the present invention. Memory 52 may be selected from a variety of types of memory that are also commercially available. An example of a suitable memory is a 32-bit EEPROM.

A power source 54 is shown in FIG. 4; power source 54 is connected with microprocessor 50 to provide power for the operation of microprocessor 50. An on-off switch 56 is connected with microprocessor 50 for manually starting and stopping the operation of microprocessor 50. A thermistor 58 is connected with microprocessor 50 to provide signals indicative of measured temperature information. Optionally, a sensitivity control 60 is connected with microprocessor 50 to adjust the sensitivity of microprocessor 50 to the signals provided by the thermistor so that the response characteristics of microprocessor 50 can be adjusted.

Also shown in FIG. 4 are three indicators 62, 64, and 66 for indicating the conditions determined by detector 15. Although only one indicator may be used, there are advantages in using more than one indicator: multiple indicators may allow different types of indicators to be used and multiple indicators may allow different types of measurements to be indicated.

For the embodiment shown in FIG. 4, indicator 62 may be used to indicate a fire hazard based on the measured temperature and may comprise one or more light emitting diodes for providing a visual indication of fire hazard. Indicator 64 may include an audible indicator such as for example a piezoelectric beeper. Indicator 64 may also be used indicate fire hazard or to communicate some other information output from microprocessor 50. Indicator 66 may be used to indicate fire hazard based on measurements of the rate of temperature rise. Indicator 66 may include one or more light emitting diodes for providing a visual indication of the fire hazard. As an option in one embodiment, indicator 62 and indicator 64 each include red and green light emitting diodes.

Another embodiment of the present invention is a method performed using an electronic device for electronically identifying fire hazards at potential fire ignition sites. Two examples of suitable electronic devices are microprocessors and central processing units such as those used for performing computer executable commands. The electronic device is used in combination with a temperature sensor. The method includes the steps of: a) acquiring signals from the temperature sensor; b) converting the signals into digital information representing at least one of a temperature, a rate of rise of temperature, and a temperature gradient; c) comparing the signals to at least one reference parameter to identify a fire hazard; d) providing a command to indicate a fire hazard when a fire hazard is identified in step c; and e) providing a command for reducing power consumption of the microprocessor after a predetermined period of time. It is to be understood that step e is an optional step. Step e can provide a power conservation capability for embodiments of the present invention. Although power conservation capability is preferable, it is not essential for practicing other embodiments of the present invention.

The use of an adjustable length member allows the firefighter to easily check locations that would otherwise be difficult or dangerous to access. This both reduces the physical effort required of the firefighter and increases the number of locations checked.

The indicators for a preferred embodiment of the present invention comprise light emitting diodes and a piezoelectric sound-producing element. These indicators provide an audible and visual indication to the user when certain thermal conditions are detected by the thermal sensor. These indicators are selected to provide a positive indication to the user in environments that may have high levels of background noise and/or bright sunlight.

Preferred embodiments of the present invention are constructed with components so that the apparatus is lightweight and compact. As firefighting tools must often be carried long distances by the individual firefighters, this is highly desirable. In addition, preferred embodiments of the present invention are constructed of materials so that the apparatus is extremely rugged and reliable under the rough conditions often encountered in the suppression of wild fires.

The embodiments of the present invention offer numerous advantages over standard techniques and equipment for detecting fire hazard. Embodiments of the present invention may be provided at lower costs than may be possible for the standard technology. Embodiments of the present invention can be fabricated using low cost and readily available components. Standard technology techniques such as infrared detection or gas phase combustion by-product detection use sensors which are inherently more costly and less readily available than sensors according to the present invention. The possible lower cost for embodiments of the present invention allows them to be widely distributed and stockpiled, thus increasing the likelihood of use. In addition, costs associated with the inevitable loss or damage of firefighting equipment is minimized since the initial investment cost is low.

Another advantage of the present invention is an improvement in reliability of detecting fire hazard. The disclosed sensing technique and associated electronic processing is easily adapted to the harsh and difficult environment associated with active firefighting.

Embodiments Of the present inventions have the potential for increased efficiency, increased speed, and increased accuracy with which the cold-trailing operation can be accomplished as compared to the standard manual methods. In addition, improved user comfort and safety that can be achieved using embodiments of the present invention reduces the likelihood of injury to the firefighter.

A preferred embodiment of the present invention demonstrates the integration of a flexible delivery method such as using a telescoping pole with a sensitive thermal sensor such as a thermistor and processing circuitry for processing the measured data. An example of a suitable circuitry is one that employs operational amplifiers, amplifiers/differentiators, to produce a cost effective, robust, and easily transported firefighting tool. Another example of a suitable circuitry is one that employs a microprocessor. In light of the present disclosure, it would be obvious to one skilled in the art that other components and materials could be utilized to provide the same functions.

An alternative embodiment of the present invention may include using a tool such as the handle of a shovel, an ax, or a pick as the elongated member. This essentially has all the same functions as described earlier for embodiments of the present invention while also making more efficient use of a tool that may already be a part of the firefighters kit. In addition, this may further reduce the cost of providing embodiments of the present invention.

As indicated earlier, embodiments of the present invention may use at least one of a rate of (a) temperature rise and (b) measurements of temperature to identify possible fire ignition sites. However, other embodiments of the present invention can be used to provide accurate measures of temperature profiles for potential fire ignition sites. In these embodiments, two or more thermal sensors are used for detection of the temperature gradients. The thermal sensors are spaced apart along the length of the elongated member. Consequently, temperature information can be gathered for each sensor at the respective temperature positions along the elongated member.

In a preferred embodiment, the electronic circuit includes an analog-to-digital converter and a microprocessor rather than the dedicated operational amplifier circuitry described above. The additional information processing capabilities of a microprocessor can further extend the functions of the circuit for processing the temperature signals from the sensor. For example, automatic ambient temperature tracking is a possible additional function for embodiments of the present invention that operate using an absolute temperature detection circuit.

Many modifications and other embodiments of the invention will come to mind to one skilled in the art to which this invention pertains, having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for probing concealed potential fire ignition sites and detecting a fire hazard, the apparatus comprising:

a temperature sensor comprising a temperature sensitive element for providing an electrical signal representing temperature information;

an electronic circuit electrically connected with the sensor so as to receive the electrical signal from the sensor, the circuit being capable of deriving at least one of a temperature and a rate of temperature rise using the signal from the sensor, the circuit being capable of converting the signal from the temperature sensor into a second signal for at least one of an audible indication, a tactile indication, and a visual indication; and an elongated member having a first end and a second end, the temperature sensor being attached to the member and positioned near the second end of the member, wherein the member comprises a handle of an ax, a handle of a shovel, or a handle of a pick for fighting fires;

whereby, a user holding the member near the first end can position the sensor in or near the potential fire ignition sites so that the sensor and the circuit can determine the fire hazard.

2. The apparatus of claim 1 wherein the circuit is physically connected with the member so that the member provides support for the circuit.

3. The apparatus of claim 1 wherein the circuit comprises a microprocessor programmed with instructions for conserving power use by the apparatus.

4. The apparatus of claim 1 therein the thermal sensor comprises a temperature dependent resistor.

5. The apparatus of claim 1 wherein the member has a length greater than about 24 inches.

6. The apparatus of claim 1 wherein the electronic circuit comprises at least one of low voltage solid state operational amplifiers, a microprocessor, and a central processing unit.

7. The apparatus of claim 6 wherein the electronic circuit performs the functions of amplification and differentiation.

8. The apparatus of claim 6 wherein the electronic circuit activates the at least one of an audible indicator, a visual indicator, and a tactile indicator in response to a predetermined reference value.

9. The apparatus of claim 8 wherein the reference value comprises a temperature of greater than about 100 degrees C.

10. The apparatus of claim 8 wherein the reference value comprises a temperature rate of rise of greater than about 0.1 degrees C. per second.

11. A method performed in a microprocessor carried by a firefighter during cold trailing for electronically identifying fire hazards at potential fire ignition sites using a temperature sensor, the method comprising the steps of:

a) acquiring signals from the temperature sensor;

b) converting the signals into digital information representing at least one of a temperature, a rate of rise of temperature, and a temperature gradient;

c) comparing the signals to at least one reference parameter to identify a fire hazard;

d) providing a command to indicate a fire hazard when a fire hazard is identified in step c; and e) providing a command for reducing power consumption of the microprocessor after a predetermined period of time.

12. The method of claim 11 wherein the digital formation comprises the rate of temperature rise and the reference parameter comprises a rate of temperature rise greater than about 0.1 degrees C. per second.

13. The method of claim 11 wherein the digital information comprises the temperature and the reference parameter comprises a temperature greater than about 100 degrees C.

14. The method of herein the sensor comprises a thermistor.

15. The method of claim 11 wherein the sensor comprises a thermocouple.

* * * * *

UNITED STATES PATENT AND TRADEMARK OFFICE

CERTIFICATE OF CORRECTION

PATENT NO. : 6,719,456 B2

DATED : April 13, 2004

INVENTOR(S) : Randall S. Mundt and James C. Mundt

It is certified that error appears in the above-identified patent and that said Letters Patent is hereby corrected as shown below:

Column 12,
Line 4, change “The method of herein the sensor comprises…” to -- The method of claim 11 wherein the sensor comprises… --

Signed and Sealed this

Twenty-eighth Day of December, 2004

JON W. DUDAS
*Director of the United States Patent and Trademark Office*